(12) United States Patent
Zhang (10) Patent No.: US 12,547,035 B2
(45) Date of Patent: Feb. 10, 2026

(54) DISPLAY PANEL AND DISPLAY DEVICE (71) Applicants: Hefei BOE Display Technology Co., Ltd., Anhui (CN); BOE Technology Group Co., Ltd., Beijing (CN)

(72) Inventor: Lin Zhang, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 385 days.

(21) Appl. No.: 18/027,939

(22) PCT Filed: Nov. 11, 2021

(86) PCT No.: PCT/CN2021/130154
§ 371 (c)(1),
(2) Date: Mar. 23, 2023

(87) PCT Pub. No.: WO2022/193692
PCT Pub. Date: Sep. 22, 2022

(65) Prior Publication Data
US 2023/0367163 A1 Nov. 16, 2023

(30) Foreign Application Priority Data
Mar. 15, 2021 (CN) .......................... 202110276361.9

(51) Int. Cl.
G02F 1/1362 (2006.01)
G02F 1/1339 (2006.01)
G02F 1/1368 (2006.01)

(52) U.S. Cl.
CPC .... *G02F 1/136286* (2013.01); *G02F 1/13396* (2021.01); *G02F 1/1368* (2013.01)

(58) Field of Classification Search
CPC ........... G02F 1/136286; G02F 1/13396; G02F 1/1368; G02F 1/13394; G02F 1/134309
See application file for complete search history.

(56) References Cited

U.S. PATENT DOCUMENTS 7,023,514 B2 4/2006 Shin et al.
8,976,330 B2 3/2015 You et al.
(Continued)

FOREIGN PATENT DOCUMENTS

CN 202472183 A 10/2012
CN 104407475 A 3/2015
(Continued)

OTHER PUBLICATIONS

International Search Report and Written Opinion mailed on Feb. 16, 2022, in corresponding PCT/CN2021/130154, 10 pages.

*Primary Examiner* — Jennifer D. Carruth
*Assistant Examiner* — Agnes Dobrowolski
(74) *Attorney, Agent, or Firm* — XSENSUS LLP (57) ABSTRACT

The present disclosure relates to the field of display technology and, more specifically, to a display panel and a display device. The display panel includes: an array substrate, an opposite substrate and a spacer. The array substrate includes: a first substrate, a plurality of rows of scan lines and a plurality of columns of data lines. The first substrate includes a plurality of sub-pixel areas, a first wiring area and a second wiring area. The plurality of rows of scan lines are formed on the first substrate and at least one row of the scan line is located in a first wiring area. The plurality of columns of data lines are formed on the first substrate and at least one column of the data line is located in a second wiring area.

18 Claims, 5 Drawing Sheets

(56) References Cited

U.S. PATENT DOCUMENTS

| | | |
|---|---|---|
| 9,354,466 B2 | 5/2016 | You et al. |
| 9,494,835 B2 | 11/2016 | Nomura |
| 9,563,083 B2 | 2/2017 | Kwak et al. |
| 9,835,906 B2 | 12/2017 | Shim et al. |
| 2003/0122977 A1 | 7/2003 | Shin et al. |
| 2014/0063421 A1 | 3/2014 | You et al. |
| 2015/0138477 A1 | 5/2015 | You et al. |
| 2015/0309358 A1* | 10/2015 | Nomura ............ G02F 1/136286 349/110 |
| 2016/0202526 A1 | 7/2016 | Shim et al. |

FOREIGN PATENT DOCUMENTS

| | | |
|---|---|---|
| CN | 204422931 U * | 6/2015 |
| CN | 105068333 A | 11/2015 |
| CN | 105842934 A | 8/2016 |
| CN | 105892188 A | 8/2016 |
| CN | 105911775 A | 8/2016 |
| CN | 205679893 U | 11/2016 |
| CN | 205691917 U | 11/2016 |
| CN | 205862049 U | 1/2017 |
| CN | 206020887 U | 3/2017 |
| CN | 206258657 A | 6/2017 |
| CN | 209297067 U | 8/2019 |
| CN | 112462556 A | 3/2021 |
| CN | 113109971 A | 7/2021 |
| CN | 214896130 U | 11/2021 |
| IN | 109407417 A | 3/2019 |
| JP | 2009-003358 A | 1/2009 |
| JP | 5744767 B2 | 7/2015 |
| KR | 2010-0018762 A | 2/2010 |
| KR | 2014-0082094 A | 7/2014 |
| KR | 102107544 B1 | 5/2020 |
| TW | 200521548 A | 7/2005 |
| TW | I253530 B | 4/2006 |

\* cited by examiner

DISPLAY PANEL AND DISPLAY DEVICE

CROSS REFERENCE TO RELATED APPLICATIONS

This application is a U.S. National Stage of International Application No. PCT/CN2021/130154, filed on Nov. 11, 2021, which claims priority to Chinese Patent Application No. 202110276361.9, entitled "Display Panel and Display Device", filed on Mar. 15, 2021, the contents of all of which are incorporated herein by reference in its entirety as part of this application.

TECHNICAL FIELD

The present disclosure relates to the field of display technology and, more specifically, to a display panel and display device.

BACKGROUND

Liquid Crystal Display (LCD) is an important flat panel display device that has been widely used in mobile phones, vehicles, monitors, TVs and public displays, and there is a growing demand for large size LCD panels in the market.

SUMMARY

A first aspect of the present disclosure provides a display panel. The display panel includes: an array substrate, an opposite substrate opposite to the array substrate, and a plurality of spacers disposed between the opposite substrate and the array substrate,
  wherein the array substrate includes:
    a first substrate, including a plurality of sub-pixel areas arranged in an array along a row direction and a column direction, a first wiring area disposed between two adjacent rows of the sub-pixel areas, and a second wiring area disposed between two adjacent columns of the sub-pixel areas;
    a plurality of rows of scan lines, formed on the first substrate, wherein at least one row of the scan line is located in one of the first wiring areas; the scan line is configured to provide a scan signal; and
    a plurality of columns of data lines, formed on the first substrate, wherein at least one column of the data line is located in one of the second wiring areas, the data line is configured to provide a data signal, and a distance between a side of the data line away from the first substrate and the first substrate is greater than a distance between a side of the scan line away from the first substrate and the first substrate,
  wherein an orthographic projection of at least part of the spacer on the first substrate overlaps with orthographic projections of the data lines in at least two columns of the second wiring areas on the first substrate.

In an example embodiment of the present disclosure, the orthographic projection of at least part of the spacer on the first substrate overlaps with orthographic projections of the data lines in two adjacent columns of the second wiring areas on the first substrate.

In an example embodiment of the present disclosure, the orthographic projections of the plurality of spacers on the first substrate overlap with orthographic projections of the data lines in at least two columns of the second wiring areas on the first substrate.

In an example embodiment of the present disclosure, the orthographic projection of the spacer on the first substrate is located in the first wiring area.

In an example embodiment of the present disclosure, the spacer is of a transparent material.

In an example embodiment of the present disclosure, wherein the spacers and the scan lines are set at intervals.

In an example embodiment of the present disclosure, each of the second wiring areas is provided with one row of the data line, and the orthographic projection of the spacer on the first substrate overlaps with orthographic projections of two adjacent data lines on the first substrate.

In an example embodiment of the present disclosure, the plurality of spacers include a primary spacer and a secondary spacer, and a length of the primary spacer is greater than that of the secondary spacer in a direction of the array substrate towards the opposite substrate.

In an example embodiment of the present disclosure, one end of the primary spacer is connected with the opposite substrate, another end of the primary spacer is connected with the data line, one end of the secondary spacer is connected with the opposite substrate, and a gap exists between another end of the secondary spacer and the data line.

In an example embodiment of the present disclosure, one end of the primary spacer is connected with the data line, another end of the primary spacer is connected with the opposite substrate, one end of the secondary spacer is connected with the data line, and a gap exists between another end of the secondary spacer and the opposite substrate.

In an example embodiment of the present disclosure, the array substrate further includes:
  a plurality of sub-pixel units, formed on the first substrate, wherein each of the sub-pixel units includes a pixel electrode at least partially located in the sub-pixel area, a common electrode and a transistor at least partially located in the first wiring area, the transistor includes a gate electrode, a first electrode and a second electrode, the first electrode is connected with the pixel electrode, the second electrode is connected with the data line, and the gate electrode is connected with the scan line.

In an example embodiment of the present disclosure, the array substrate further includes:
  a plurality of rows of common lines, formed on the first substrate, wherein at least one row of the common line is located in one of the first wiring areas, the common line is connected with the common electrode and configured to provide a common signal to the sub-pixel unit.

In an example embodiment of the present disclosure, one row of the scan line and one row of the common line are provided within each of the first wiring areas.

In an example embodiment of the present disclosure, the pixel electrode is located on a side of the common electrode close to the first substrate, and the common electrode is a slit electrode.

In an example embodiment of the present disclosure, the display panel further includes:
  liquid crystal molecules, located between the opposite substrate and the array substrate.

In an example embodiment of the present disclosure, the opposite substrate includes:
  a second substrate, including a plurality of display areas and a non-display area surrounding the display areas, wherein the plurality of display areas are provided in one-to-one correspondence with the plurality of sub-pixel units;

a color film layer, disposed on the second substrate and located in the display area;

a black matrix, provided on the second substrate and located in the non-display area.

In an example embodiment of the present disclosure, an orthographic projection of the spacer on the second substrate overlaps with an orthographic projection of the black matrix on the second substrate.

A second aspect of the present disclosure provides a display device, including the display panel described in any of the above embodiments.

Other features and advantages of the present disclosure will become apparent through the following detailed description, or will be learned in part through the practice of the present disclosure.

It should be understood that the above general description and the later detailed description are only exemplary and explanatory and do not limit the present disclosure.

BRIEF DESCRIPTION OF THE DRAWINGS

The accompanying drawings, which are incorporated in and constitute a part of this specification, illustrate embodiments consistent with the disclosure and serve to explain the principles of the disclosure together with the description. The drawings in the following description are only some embodiments of the present disclosure, and for those of ordinary skill in the art, other drawings can also be obtained from these drawings without creative effort.

DETAILED DESCRIPTION

The technical solutions of the present disclosure are further specified below by means of embodiments and in conjunction with the accompanying drawings. Throughout the specification, identical or similar reference numerals indicate identical or similar components. The following description of embodiments of the present disclosure with reference to the accompanying drawings is intended to explain the general conception of the present disclosure and should not be construed as a limitation of the present disclosure.

Further, in the detailed description below, a number of specific details are set forth to provide a comprehensive understanding of embodiments of the present disclosure for ease of interpretation. It is apparent, however, that one or more embodiments may also be implemented without these specific details.

In the related art, as for the problem of blue spots and black defects (black Gap) that are more likely to occur in stress tests as the size of the panel increases, it is mainly addressed by increasing the width of the black matrix (BM) and increasing the size of the spacer (PS), but this reduces the transmittance of the display panel and makes the product less competitive.

Figure 1:
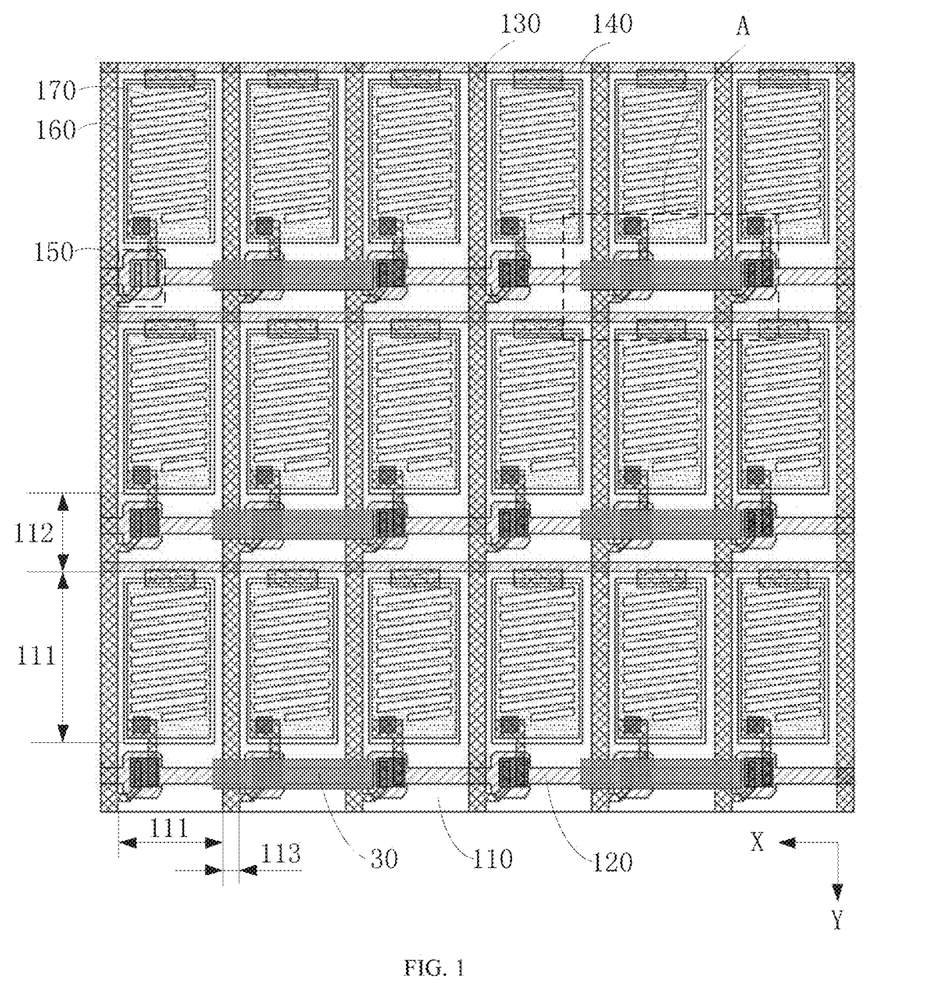
FIG. 1 illustrates a schematic diagram of the structure of the array substrate and the spacer in the display panel described in an embodiment of the present disclosure.
Figure 2:
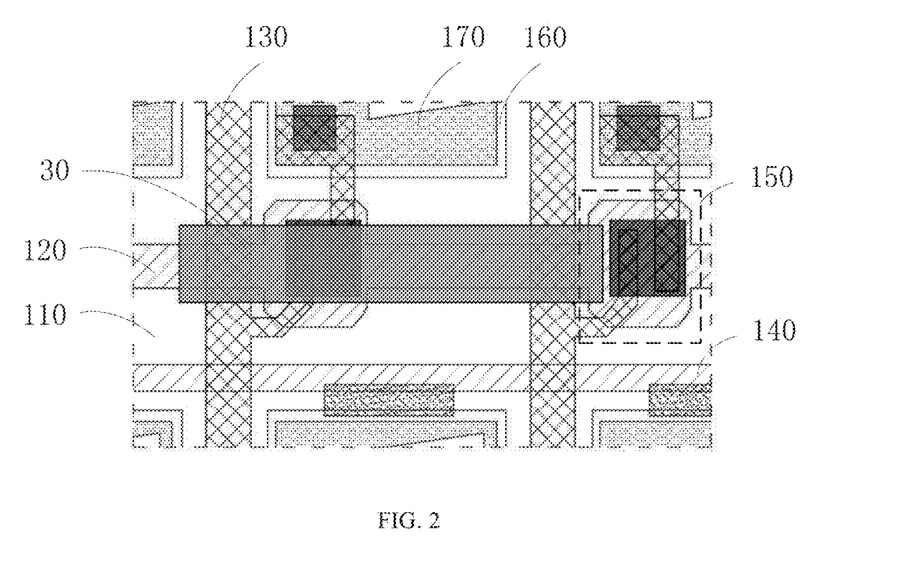
FIG. 2 illustrates a schematic diagram of an enlarged structure of the area A shown in FIG. 1.
Figure 8:
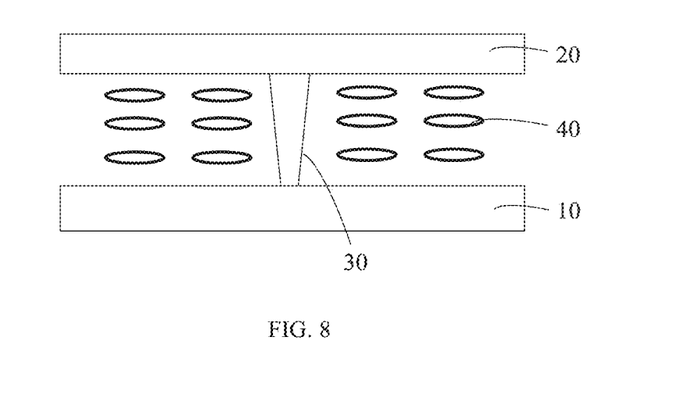
FIG. 8 illustrates a schematic diagram of the position relationship between the spacer and the array substrate, the opposite substrate described in an embodiment of the present disclosure.

To address the above problems, embodiments of the present disclosure provide a display panel, which may be a liquid crystal display panel. As shown in FIGS. 1, 2 and 8, the display panel may include an array substrate 10, an opposite substrate 20 opposite to the array substrate 10, and a plurality of spacers 30 disposed between the opposite substrate 20 and the array substrate 10. The setting of the plurality of spacers 30 may improve the uniformity of the overall thickness of the display panel, improve the tolerance of the display panel to fluctuations of liquid crystal molecules, and thereby improve the yield of the display panel.

The array substrate 10 may include a first substrate 110 and a plurality of rows of scan lines 120 and a plurality of columns of data lines 130 formed on the first substrate 110. The first substrate 110 includes a plurality of sub-pixel areas 111 arranged in an array along a row direction and a column direction, a first wiring area 112 disposed between two adjacent rows of the sub-pixel areas 111, and a second wiring area 113 disposed between two adjacent columns of the sub-pixel areas 111. The plurality of rows of scan lines 120 are formed on the first substrate 110. At least one row of the scan line 120 is located in one of the first wiring areas 112. The scan line 120 is configured to provide a scan signal. A plurality of columns of data lines 130 are formed on the first substrate 110. At least one column of the data line 130 is located in one of the second wiring areas 113. The data line 130 is configured to provide a data signal. A distance between a side of the data line 130 away from the first substrate 110 and the first substrate 110 is greater than a distance between a side of the scan line 120 away from the first substrate 110 and the first substrate 110. That is, the height of the data line 130 on the first substrate 110 is greater than the scan line 120.

An orthographic projection of at least part of the spacer 30 on the first substrate 110 overlaps with orthographic projections of the data lines 130 in at least two columns of the second wiring areas 113 on the first substrate 110. That is, the spacer 30 is supported by the data lines 130 located in different columns.

In the display panel provided by the present disclosure, the spacer is located above the sub-pixel units of the array substrate since the spacer is supported by the data lines located in different columns during the stress test of the display panel, so that the spacer will not contact the display area, thus avoiding the problem of "color spots" caused by the contact of the spacer with the display area. At the same time, since the "color spots" problem can be completely improved, the existing light-blocking structure (Barrier) around the spacer can also be removed. Since the black matrix does not need to block the light-blocking structure, the area of the black matrix can be reduced and the opening size can be significantly increased, thus increasing the opening ratio of the sub-pixel units.

In addition, since the spacer 30 is supported by the data lines 130 in different columns, the contact area between the spacer 30 and the array substrate 10 can be increased by adjusting the width of the spacer 30 in the extending direction of the data lines 130, thus increasing the pressure resistance and thus increasing the black Gap resistance of the display panel, especially for high PPI products, e.g. the current maximum PPI 65 8K products.

In an embodiment of the present disclosure, as shown in FIG. 8, the display panel further includes liquid crystal molecules 40, which are located between the opposite substrate 20 and the array substrate 10. By way of example, the liquid crystal molecules 40 may be negative liquid crystal molecules, but without limitation, it may also be positive liquid crystal molecules.

In embodiments of the present disclosure, the array substrate 10 further includes a plurality of sub-pixel units. The plurality of sub-pixel units are formed on the first substrate 110. Each of the sub-pixel units includes a pixel electrode 160 at least partially located in the sub-pixel area 111, a common electrode 170 and a transistor 150 at least partially located in the first wiring area 112. The transistor 150 includes a gate electrode 151, a first electrode 153 and a second electrode 154. The first electrode 153 is connected with the pixel electrode 160, the second electrode 154 is connected with the data line 130, and the gate electrode 151 is connected with the scan line 120. In addition, a capacitor (not shown in the figure) may also be included in the sub-pixel unit.

As shown in FIG. 1, the first substrate 110 may have a plurality of sub-pixel areas 111 arranged in an array along a row direction X and a column direction Y, a first wiring area 112 disposed between two adjacent rows of the sub-pixel areas 111, and a second wiring area 113 disposed between two adjacent columns of the sub-pixel areas 111. There is an overlap between the first wiring area 112 and the second wiring area 113.

In an embodiment of the present disclosure, the material of the first substrate 110 may be an inorganic material. The inorganic material may be, for example, a glass material such as soda lime glass, quartz glass, sapphire glass, or a metallic material of various metals such as stainless steel, aluminum, nickel, etc. or alloys thereof. In other embodiments, the material of the first substrate 110 may also be an organic material. The organic material may be, for example, poly methyl methacrylate (PMMA), polyvinyl alcohol (PVA), polyvinyl phenol (PVP), poly ether sulfone (PES), polyimide, polyamide, polyacetal, polycarbonate (PC), polyethylene terephthalate (PET), polyethylene naphthalate (PEN) or a combination thereof. In other embodiments, the material of the first substrate 110 may also be a flexible material, such as polyimide (PI). The first substrate 110 may be a single-layer structure or a multi-layer structure, and the multi-layer structure may be formed of different materials.

Figure 3:
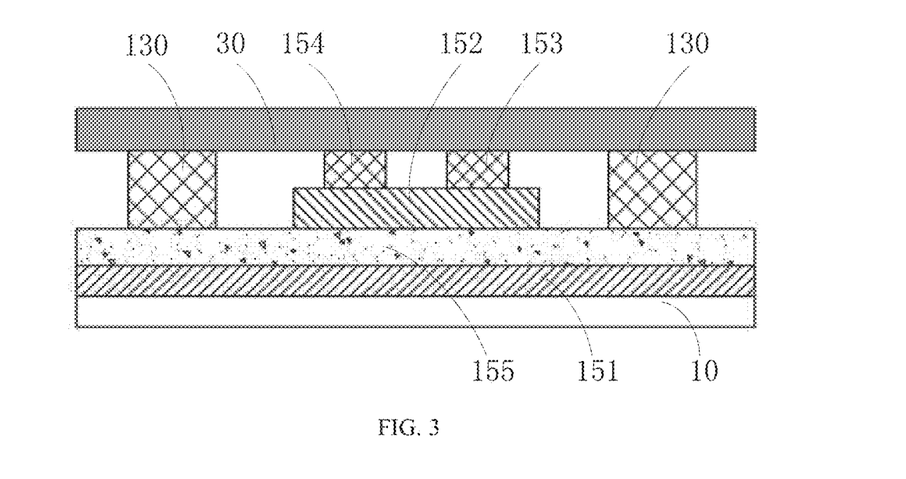
FIG. 3 illustrates a partial sectional view of FIG. 1 as described in an embodiment of the present disclosure.
Figure 5:
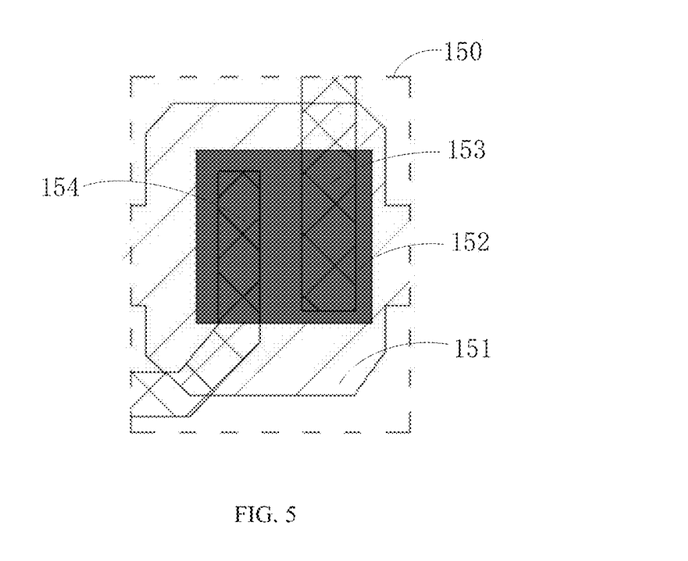
FIG. 5 illustrates a schematic view of an enlarged structure of the transistor shown in FIG. 1.

In embodiments of the present disclosure, as shown in FIGS. 3 and 5, the transistor 150 may include an active layer 152, a gate electrode 151 and a first electrode 153 and a second electrode 154 provided in the same layer. A gate insulating layer 155 may also be provided between the gate electrode 151 and the active layer 152, to insulate the gate electrode 151 and the active layer 152 from each other. It is to be noted that the gate electrode 151 may be provided in the same layer as the scan line 120, and the gate electrode 151 may be part of the scan line 120 described above.

For example, the material of the gate electrode 151 may be a conductive material. The conductive material is, for example, a metal, a conductive metal oxide, a conductive polymer, a conductive composite material or a combination thereof. By way of example, the metal may be platinum, gold, silver, aluminium, chromium, nickel, copper, molybdenum, titanium, magnesium, calcium, barium, sodium, palladium, iron, manganese or a combination thereof. The conductive metal oxide may be $InO_2$, $SnO_2$, indium tin oxide (ITO), fluorine-doped tin oxide (FTO), aluminium-doped zinc oxide (AZO), gallium-doped zinc oxide (GZO) or a combination thereof. The conductive polymer may be polyaniline, polypyrrole, polythiophene, polyacetylene, poly(3,4-ethylenedioxythiophene)/poly(styrenesulfonate) (PEDOT/PSS) or a combination thereof. The conductive composite material may be a conductive composite material or the like dispersed with carbon black, graphite powder, metal microparticles, etc. The gate electrode 151 is formed, for example, by physical vapour deposition (PVD), chemical vapour deposition (CVD), spin coating or a combination thereof.

For example, the gate insulating layer 155 may be silicon oxide, silicon oxynitride, silicon nitride or other suitable insulating substances (e.g. organic polymer compounds) or a combination thereof. The gate insulating layer 155 is formed, for example, by physical vapour deposition, chemical vapour deposition, spin coating or a combination thereof.

For example, the material of the first electrode 153 and the second electrode 154 may include a metal, a conductive oxide or a combination thereof. By way of example, the metal may be titanium, platinum, ruthenium, gold, silver, molybdenum, aluminium, tungsten, copper, neodymium, chromium, tantalum or an alloy thereof or a combination thereof. The conductive oxide may be indium zinc oxide (IZO), aluminium-doped zinc oxide (AZO), indium tin oxide (ITO), gallium zinc oxide (GZO), zinc tin oxide (ZTO) or a combination thereof. The method of forming the first electrode 153 and the second electrode 154 is, for example, PVD, CVD or a combination thereof. The materials of the first and second electrodes 153 and 154 may be the same or different. The use of the same material can reduce the cost and difficulty of the process of forming the first electrode 153 and the second electrode 154.

For example, the material of the active layer 152 may be amorphous silicon, polycrystalline silicon, microcrystalline silicon, single crystal silicon, oxide semiconductor material, organic silicon material, organic oxide semiconductor material or a combination thereof. The method of forming the active layer 152 is, for example, PVD, CVD or a combination thereof.

In an embodiment of the present disclosure, the transistor 150 may be a top gate type, or a bottom gate type. In the embodiment of the present disclosure, the transistor 150 is mainly described as an example of a bottom gate type. When the transistor 150 is of the bottom gate type, the gate electrode 151 is formed on the first substrate 110. The gate electrode 151 may include metallic or alloy materials, including for example molybdenum, aluminium and titanium or the like, to ensure good electrical conductivity. The gate insulating layer 155 is formed on the first substrate 110 and covers the gate electrode 151. The active layer 152 is formed on the side of the insulating layer away from the first substrate 110. The first electrode 153 and the second electrode 154 are connected with two doping regions of the active layer 152 respectively.

It should be understood that the number of transistors 150 in the sub-pixel unit may be provided in a plurality, and this transistor 150 is classified as N-type and P-type, etc.

In the embodiment of the present disclosure, the pixel electrode 160 may be connected to the first electrode 153. When the transistor 150 connected to the pixel electrode 160 is of the N type, the first electrode 153 of the transistor 150 may be a drain electrode and the second electrode 154 may be a source electrode. When the transistor 150 connected to the pixel electrode 160 is of the P type, the first electrode 153 of the transistor 150 may be a source electrode and the second electrode 154 may be a drain electrode. There is an overlap between the orthographic projection of the common electrode 170 on the first substrate 110 and the orthographic projection of the pixel electrode 160 on the first substrate 110.

In an embodiment of the present disclosure, the pixel electrode 160 may be located on the side of the common electrode 170 close to the first substrate 110. That is, the pixel electrode 160 may be fabricated on the first substrate 110 prior to the common electrode 170. For example, this pixel electrode 160 may be a plate electrode. That is, the pixel electrode 160 is a whole piece without slits, while the common electrode 170 may be a slit electrode with a slit structure. The electric field generated between the pixel electrode 160 and the common electrode 170 deflects all the liquid crystal molecules 40 between the electrodes and directly above the electrodes, which improves the operating efficiency of the liquid crystals and increases the light transmission efficiency. Without limitation, it is also possible that the pixel electrode 160 is located on the side of the common electrode 170 away from the first substrate 110. This pixel electrode 160 is a slit electrode having a slit structure, and the common electrode 170 is a plate electrode.

It is to be noted that, the embodiment of the present disclosure is mainly based on that the pixel electrode 160 is located on the side of the common electrode 170 close to the first substrate 110, and the pixel electrode 160 may be a plate electrode while the common electrode 170 may be a slit electrode having a slit structure.

In order to ensure the light transmittance of the array substrate 10, the pixel electrode 160 may be made of the ITO material, but not limited to this. It may also be made of transparent materials such as indium zinc oxide (IZO), zinc oxide (ZnO), etc. That is, since the material of the pixel electrode 160 is different from that of the gate electrode 151, the first electrode 153 and the second electrode 154 of the transistor 150, the pixel electrode 160 can be fabricated using a different patterning process from the gate electrode 151, the first electrode 153 and the second electrode 154 of the transistor 150.

For example, the pixel electrode 160 may be located on the side of the first electrode 153 and the second electrode 154 of the transistor 150 close to the first substrate 110. The pixel electrode 160 may be connected to the first electrode 153 of the transistor 150 through a via hole structure. The pixel electrode 160 may be formed on the first substrate 110 before the gate electrode 151 of the transistor 150 is formed. That is, when the array substrate 10 is fabricated, the pixel electrode 160 may be formed on the first substrate 110 using a patterning process before the gate electrode 151 of the transistor 150 is formed on the first substrate 110 using another patterning process. It should be noted that although both the pixel electrode 160 and the gate electrode 151 are formed on the first substrate 110, the pixel electrode 160 and the gate electrode 151 are disconnected from each other, i.e., there is no connection between the pixel electrode 160 and the gate electrode 151. Without limitation, the pixel electrode 160 may also be formed on first substrate 110 after the gate electrode 151 of transistor 150 is formed, and this pixel electrode 160 may also be located on the side of gate electrode 151 away from first substrate 110.

Similarly, in order to ensure the light transmittance of the array substrate 10, the common electrode 170 may also be made of a transparent conductive material such as ITO. The common electrode 170 may be formed on the side of the first electrode 153 and the second electrode 154 of the transistor 150 away from the first substrate 110. It should be understood that there is also an insulating layer between the common electrode 170 and the first electrode 153, the second electrode 154 of the transistor 150.

Specifically, at least one row of the scan line 120 may be located in a first wiring area 112. In other words, at least one row of the scan line 120 may be provided in each first wiring area 112. The scan line 120 is connected with the gate electrode 151 of the transistor 150 in the sub-pixel unit. As described above, the scan line 120 may be provided in the same layer as the gate electrode 151 of the transistor 150 and of a one-piece structure. The scan line 120 is configured to provide a scan signal to the sub-pixel unit.

Specifically, at least one row of common line 140 may be located in a first wiring area 11. In other words, at least one row of common line 140 may be provided in each first wiring area 112. The common line 140 is connected to the common electrode 170, and configured to provide a common signal to the sub-pixel unit. For example, the common line 140 may be located in the same layer as the scan line 120. That is, the common line 140 may be located on a side of the common electrode 170 close to the first substrate 110. The common line 140 may be connected to the common electrode 170 through a via hole. Specifically, the common line 140 may be connected to the signal connection strip of the common electrode 170 through the via hole structure. It should be understood that this signal connection strip may be located in the first wiring area 112.

By way of example, as shown in FIG. 1, each first wiring area 112 may be provided with a row of scan line 120 and a row of common line 140. It should be understood that this scan line 120 and common line 140 are disconnected from each other. That is, the orthographic projection of the scan line 120 on the first substrate 110 does not overlap with the orthographic projection of the common line 140 on the first substrate 110. It should be noted that the first wiring area 112 is not limited to having one row of scan line 120 and one row of common line 140, but can also have two rows of scan lines 120, or no common lines 140, etc., which depends on specific situations. Embodiments of the present disclosure are mainly illustrated by providing one row of scan line 120 and one row of common line 140 within each of the first wiring areas 112.

At least one column of data line 130 may be located in a second wiring area 113. In other words, at least one column of data line 130 is provided within each second wiring area 113. This data line 130 may be connected to the second electrode 154 of the transistor 150 in the sub-pixel unit, and configured to provide a data signal to the sub-pixel unit. The orthographic projection of the data line 130 on the first substrate 110 overlaps with the orthographic projections of the scan line 120 and the common line 140 on the first substrate 110. It is to be noted that the data line 130 of an embodiment of the present disclosure may be provided in the same layer as the first electrode 153 and the second electrode 154 of the transistor 150 in the sub-pixel unit. That is, they may be fabricated by using the same patterning process, to reduce the cost of the mask, but not limited to this. They may also be fabricated by different patterning processes, which depends on specific situations.

In an embodiment of the present disclosure, an orthographic projection of at least part of the spacer 30 on the first substrate 110 overlaps with orthographic projections of the data lines 130 in at least two columns of the second wiring areas 113 on the first substrate 110. In other words, at least part of the spacer 30 stretches across the two adjacent columns of the second wiring areas 113. Preferably, all of the spacers 30 stretch across two adjacent columns of the second wiring areas 113.

Optionally, at least part of the spacers 30 stretches across the three, four or more adjacent columns of the second wiring areas 113. The present disclosure does not limit this, which depends on specific situations.

In one embodiment of the present disclosure, the orthographic projection of the spacer 30 on the first substrate 110 is located in the first wiring area 112, i.e. the spacer 30 is located on the second wiring area 113, thereby avoiding blocking the display area and improving the light transmittance. Without limitation, the orthographic portion of the spacer 30 on the first substrate 110 may be located in the sub-pixel area 111. That is, the spacer 30 is provided on the sub-pixel unit, so that the contact density of the spacer 30 is not affected by the alignment accuracy. The spacer 30 is provided at intervals from the scan line 120, i.e. the spacer 30 does not directly abut the scan line 120. It is to be noted that other functional layers may be provided between the spacer 30 and the scan line 120.

In an embodiment of the present disclosure, the orthographic projection of the spacer 30 on the first substrate 110 is located in the first wiring area 112, and the orthographic projection of the spacer 30 on the first substrate 110 overlaps with the orthographic projection of the scan line 120 on the first substrate 110, i.e. the spacer 30 is located above the overlap of the scan line 120 and the data line 130. The part where the scan line 120 and the data line 130 overlap is higher relative to the height of the first substrate 110, and setting the spacer 30 at the position where the scan line 120 overlaps with the data line 130 can increase the distance between the spacer 30 and the array substrate 10.

In an embodiment of the present disclosure, the orthographic projection of the spacer 30 on the first substrate 110 is located in the first wiring area 112, and the orthographic projection of the spacer 30 on the first substrate 110 overlaps with the orthographic projection of the common line 140 on the first substrate 110, i.e. the spacer 30 is located above the overlap of the common line 140 and the data line 130. The part where the common line 140 overlaps with the data line 130 is higher relative to the height of the first substrate 110, and setting the spacer 30 at the position where the scan line 120 overlaps with the data line 130 can increase the distance between the spacer 30 and the array substrate 10.

Figure 4:
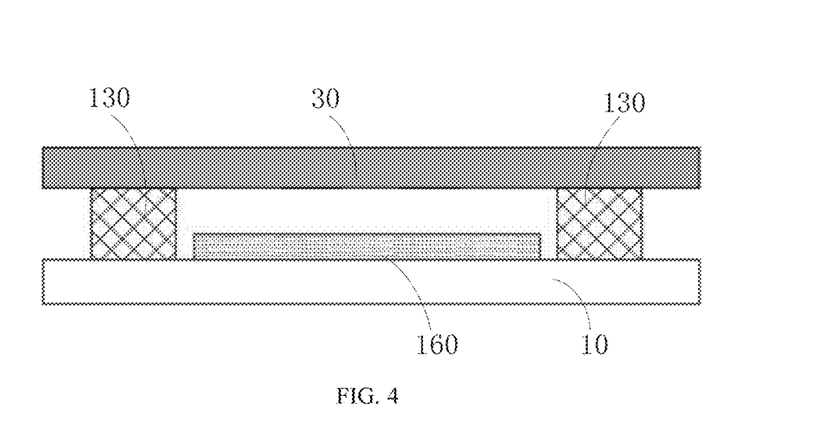
FIG. 4 illustrates a partial sectional view of FIG. 1 as described in another embodiment of the present disclosure.

It should be noted that, as shown in FIG. 4, when the spacer 30 is provided on the sub-pixel unit, the spacer 30 is formed of a transparent material, such as by a transparent resin material, which can avoid blocking light. When the spacer 30 is provided on the second wiring area 113, the spacer 30 may be formed of a transparent material or a non-transparent material, and the present disclosure does not limit this. In addition, the spacer 30 may also be a resilient material, so that when the spacer 30 is squeezed, it can produce certain deformation, so as to absorb a portion of the squeezing pressure, thereby avoiding excessive squeezing pressure on the array substrate 10. At the same time, through the recovery force of the spacer 30, the impact caused by the external force on the array substrate 10 can be quickly recovered.

In an embodiment of the present disclosure, the spacer 30 is formed on the array substrate 10. The orthographic portion of the spacer 30 on the first substrate 110 is located in the sub-pixel area 111. A height padding layer may be provided on the color film substrate 20 at the position corresponding to the data line 130, so that the spacer 30 is located between the data line 130 and the height padding layer, to reduce the distance between the spacer 30 and the color film substrate 20. The height padding layer may be formed on the black matrix, the color film layer or the protective layer (Over Coating, OC) of the color film substrate 20. The height of the height padding layer may be set according to the target distance between the spacer 30 and the color film substrate 20, which depends on specific situations.

The height padding layer may be formed of a metallic material, which may be, for example, titanium, platinum, ruthenium, gold, silver, molybdenum, aluminium, tungsten, copper, indium zinc oxide (IZO), indium tin oxide (ITO), gallium zinc oxide (GZO), zinc tin oxide (ZTO) or a combination thereof. The height padding layer may also be formed of a non-metallic material, such as resin. The material of the height padding layer may be the same as that of the data line. The height padding layer may be a single-layer structure or a multi-layer structure, and the materials of the multi-layer structure may be the same or different.

In another embodiment of the present disclosure, the spacer 30 is formed on the color film substrate 20, and the orthogonal projection of the spacer 30 on the first substrate 110 is located in the sub-pixel area 111. A height padding layer may be provided on the data line 130 at a position corresponding to the spacer 30, so that the height padding layer is located between the data line 130 and the spacer 30, to reduce the distance between the spacer 30 and the array substrate 10. The height of the height padding layer may be set according to the target distance between the spacer 30 and the array substrate 10, which depends on specific situations.

In an embodiment of the present disclosure, the spacer 30 is formed on the array substrate 10. The orthographic projection of the spacer 30 on the first substrate 110 is located in the sub-pixel area 111. A height padding layer may be provided on the color film substrate 20 at a position corresponding to the sub-pixel area 111. The height padding layer is located between the color film substrate 20 and the spacer 30, to reduce the distance between the spacer 30 and the color film substrate 20. The height padding layer may be formed on the black matrix, color film layer or protective layer of the color film substrate 20. The height of the height padding layer may be set according to the target distance between the spacer 30 and the color film substrate 20, which depends on specific situations.

In another embodiment of the present disclosure, the spacer 30 is formed on the color film substrate 20. The orthographic projection of the spacer 30 on the first substrate 110 is located in the sub-pixel area 111. The spacer 30 is located on the color film substrate 20 at a position corresponding to the sub-pixel area 111. A height padding layer may be provided on the array substrate 10 at a position corresponding to the spacer 30. The height padding layer is located between the array substrate 10 and the spacer 30, to reduce the distance between the spacer 30 and the array substrate 10. The height padding layer may be formed on the first substrate 110 or formed on other metal layers or organic film layers. The height of the height padding layer may be set according to the target distance between the spacer 30 and the array substrate 10, which depends on specific situations.

By way of example, as shown in FIG. 1, each second wiring area 113 may be provided with a column of data line 130. The data line 130 may be connected to the second electrode 154 of each sub-pixel unit in the same column. That is, the data line 130 may provide data signals for the same column of sub-pixel units. An orthographic projection of at least part of the spacer 30 on the first substrate 110 overlaps with orthographic projections of two adjacent columns of the data lines 130 on the first substrate 110. That is, the spacer 30 stretches across the two adjacent columns of the second wiring areas 113.

Optionally, the two first electrodes 153 located on opposite sides of the data line 130 in the row direction X and adjacent to each other may be equally spaced from the data line 130 in the row direction X, to ensure that the coupling capacitances of the data line 130 and the transistors 150 on both sides are approximately the same, thereby ensuring uniformity of the light effect on both sides of the data line 130.

Similarly, the pixel electrodes 160 located on opposite sides of the data line 130 in the row direction X and adjacent to each other may be provided symmetrically about the data line 130, and the two common electrodes 170 located on opposite sides of the data line 130 in the row direction X and adjacent to each other are provided symmetrically about the data line 130, to ensure that the coupling capacitances of the data line 130 and the pixel electrode 160 and the common electrode 170 on both sides are approximately the same, so as to ensure the uniformity of the light effect on both sides of the data line 130.

Optionally, in one column of the sub-pixel units, the first electrode 153 of each sub-pixel unit and the data line 130 connected thereto are equally spaced in the row direction X, to ensure that the coupling capacitances between the transistor 150 of each sub-pixel unit in each column and the data line 130 are approximately the same, so as to ensure uniformity of the light effect at each sub-pixel unit in each column. It should be noted that while the first electrode 153 of each sub-pixel unit in one column of the sub-pixel unit and the data line 130 connected thereto are equally spaced in the row direction X, the overlapping area of the gate electrode 151 and the first electrode 153 in that column needs to be consistent with other columns.

In an embodiment of the present disclosure, the opposite substrate 20 may include a second substrate (not shown in the figures) located on the side of the spacer 30 away from the array substrate 10 and a black matrix 210 located on the side of the second substrate close to the array substrate 10. The black matrix 210 has a first shielding portion 211 along the column direction Y, and a second shielding portion 212 along the row direction X. It should be noted that the first shielding portion 211 and the second shielding portion 212 have an intersection shielding portion. The orthographic projection of the intersection shielding portion on the first substrate 110 at least covers the overlapping area of the first wiring area 112 and the second wiring area 113, while the orthographic projection of the first shielding portion 211 on the first substrate 110 at least covers the first wiring area 112 and is located outside the second wiring area 113, and the orthographic projection of the second shielding portion 212 on the first substrate 110 at least covers the second wiring area 113 and is located outside the first wiring area 112. Without limitation, the black matrix 210 may also be formed on the side of the second substrate away from the array substrate 10.

Figure 6:
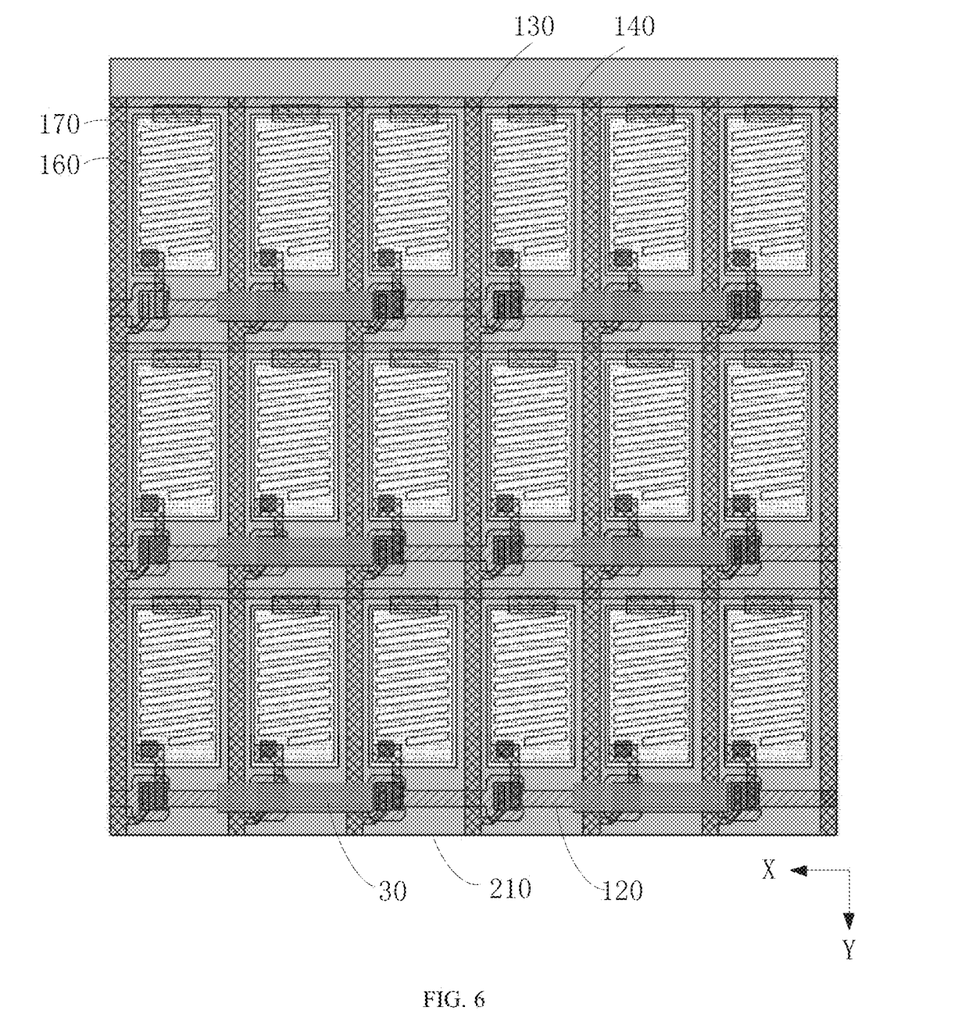
FIG. 6 illustrates a schematic view of the position relationship between the array substrate and the black matrix shown in FIG. 1.
Figure 7:
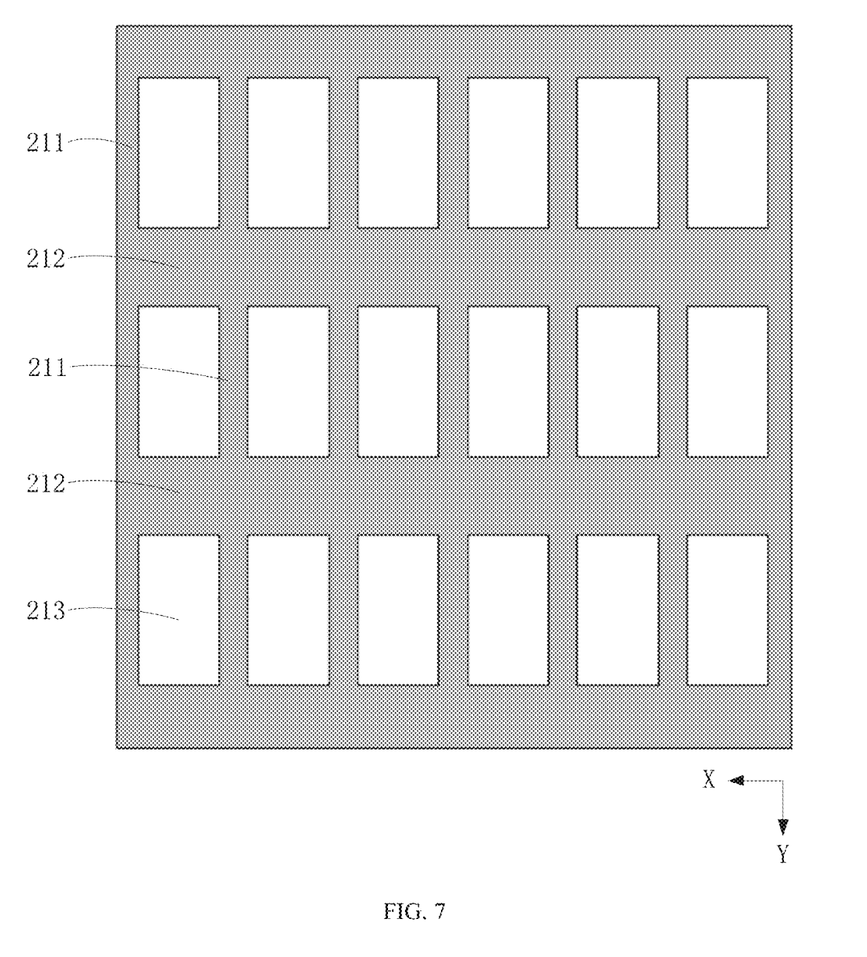
FIG. 7 illustrates a schematic view of the structure of the black matrix shown in FIG. 6.

In combination with FIGS. 6 and 7, the first shielding portion 211, the second shielding portion 212 and the intersection shielding portion in the black matrix 210 may be arranged in an array. A light transmitting hole may be surrounded by the first shielding portion 211, the second shielding portion 212 and the intersection shielding portion which are arranged in an array. The orthographic projection of the light transmitting hole 213 on the first substrate 110 is located in the sub-pixel area 111. The light transmitting hole 213 is used to allow light to pass through. When the area of the entire display panel is constant, the larger the total area of the light transmitting hole 213 is, i.e. the smaller the total area of the shielding portions is, the higher the light transmittance of the display panel is and the better the display effect is.

It should be noted that in order to ensure that the black matrix 210 can completely cover the wiring area on the array substrate 10, it can be made so that the orthographic projection of the first shielding portion 211, the second shielding portion 212 and the intersection shielding portion in the black matrix 210 on the first substrate 110 can also cover part of the sub-pixel areas 111.

In the embodiment of the present disclosure, the black matrix 210 may not only cover the data line 130, the common line 140, the scan line 120, the transistor 150 and part of the common electrode 170, but also cover part of the pixel electrode 160. A coupling electric field exists in a region where an edge of the pixel electrode 160 is close to the scan line 120 and the data line 130, thus, during the display process, the liquid crystal arrangement is disordered, a failure region is generated, and light leakage occurs on an edge of a dark-state pixel, therefore, a black matrix is required to shield this failure region.

It should be noted that the second substrate includes a plurality of display areas and a non-display area surrounding the display areas. The plurality of display areas are provided in one-to-one correspondence with the plurality of sub-pixel units. The black matrix 210 is provided on the second substrate and is located in the non-display area. The color film layer is provided on the second substrate and is located in the display area. That is, the black matrix 210 is formed at a position corresponding to the boundary of the adjacent sub-pixel units of the color film layer, thereby preventing crosstalk between different sub-pixels. The color film layer may be formed on the side of the second substrate close to the array substrate 10, or on the side of the second substrate away from the array substrate 10. The present disclosure is not limited to this, which depends on specific situations.

In embodiments of the present disclosure, the black matrix 210 may be of a material such as metallic chromium or chromium oxide, or may be of an acrylic resin doped with a black pigment (e.g. carbon). The specific form of the black matrix is not limited herein.

The orthographic projection of the spacer 30 on the second substrate has an overlapping portion with the orthographic projection of the black matrix 210 on the second substrate. The spacer 30 may be formed on the black matrix 210.

In embodiments of the present disclosure, the plurality of spacers 30 may include a primary spacer and a secondary spacer. The primary spacer may be in contact with the array substrate 10 and the opposite substrate 20 at each end respectively when the display panel does not receive external pressure, primarily to play a support role. When the display panel does not receive external pressure, the secondary spacer, if formed on the opposite substrate 20, has one end of the spacer 30 connected to the opposing substrate 20 and there is a gap between the other end and the data line 130. That is, there is a certain interval between the secondary spacer and the array substrate 10, i.e. there is a segment difference (height difference) between the primary spacer and the secondary spacer. The thickness of the display panel can be finely tuned by adjusting the segment difference between the primary spacer and the secondary spacer. If the secondary spacer is formed on the array substrate 10, one end of the secondary spacer is connected to the data line 130 and there is a gap between the other end of the secondary spacer and the opposite substrate 20. That is, there is a certain interval between the secondary spacer and the opposite substrate 20.

For example, in the direction of the array substrate 10 towards the opposite substrate 20, the height of the primary spacer is greater than that of the secondary spacer. When the display panel is subjected to external pressure, the primary spacer bears all the pressure first and compresses. When the primary spacer compresses until the segment difference between the primary spacer and the secondary spacer drops to zero, the primary spacer and the secondary spacer jointly bear the external pressure.

It should be noted that the primary spacer and the secondary spacer can be arranged according to a certain cycle. The size and height of different types of spacers need to be monitored during the production process. Since the size of the spacer is small, and the primary spacer is generally less, it is difficult for the equipment to accurately identify the position of the primary spacer by only relying on the size. Generally, a certain position around the primary spacer is designed without a spacer (namely, no spacer is provided), so as to facilitate identifying the position of the primary spacer more quickly and more accurately and monitoring the same. For example, when designing, no spacer is provided below the primary spacer, and when monitoring, the position where no spacer is provided can be quickly determined first, then, according to the design rules described above, it can be determined that a spacer at a location below which no spacer is provided is the primary spacer.

Embodiments of the present disclosure also provide a display device including a display panel as described in any of the above embodiments. This display device may be a liquid crystal display device.

According to the embodiments of the present disclosure, the specific type of display device is not particularly limited, and any type of display device commonly used in the field may be used, for example, LCD displays, mobile devices such as mobile phones, laptops, wearable devices such as watches, VR devices, etc., which may be selected accordingly by a person skilled in the art according to the specific use of the display device, and will not be repeated here.

It should be noted that the display device includes other necessary components and parts in addition to the display panel. In the case of a display for example, it may also include a backlight module, a housing, a main circuit board, a power cable, etc., which may be added accordingly by a person skilled in the art according to the specific requirements of the use of the display device, and which will not be repeated here.

It should be noted that the terms "on . . . ", "formed on . . . " and "provided on . . . " described herein can mean that a layer is formed or set directly on another layer, or that a layer is formed or set indirectly on another layer, i.e. there are other layers between the two layers.

The terms "a", "one", "the", "said" and "at least one" are used to indicate the existence of one or more elements/components/etc.; the terms "including" and "having" are used to indicate an open-ended inclusion and refer to the existence of elements/components/etc. in addition to those listed elements/components/etc.

It should be noted that while the terms "first", "second", etc. may be used herein to describe various regions, layers and/or parts, these regions, layers and/or parts should not be limited by these terms. Rather, these terms are used to distinguish one region, layer and/or part from another region, layer and/or part.

In this disclosure, unless otherwise stated, the term "provided in the same layer" is used to mean that two layers, parts, components, elements or portions may be formed by the same patterning process, and that the two layers, parts, components, elements or portions are generally formed of the same material.

In this disclosure, unless otherwise specified, the expression "patterning process" generally includes the steps of coating the photoresist, exposure, development, etching, and stripping of the photoresist or the like. The expression "once patterning process" means a process of forming patterned layers, parts, components, etc. using a single mask.

Other embodiments of the present disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or conventional technical means in the technical field not disclosed by this disclosure. The specification and embodiments are to be regarded as exemplary only, with the true scope and spirit of the disclosure being indicated by the appended claims.

What is claimed is:

1. A display panel, comprising: an array substrate, an opposite substrate opposite to the array substrate, and a plurality of spacers disposed between the opposite substrate and the array substrate,
   wherein the array substrate comprises:
   a first substrate, comprising a plurality of sub-pixel areas arranged in an array along a row direction and a column direction, a first wiring area disposed between two adjacent rows of the sub-pixel areas, and a second wiring area disposed between two adjacent columns of the sub-pixel areas;
   a plurality of rows of scan lines, formed on the first substrate, wherein at least one row of the scan line is located in one of the first wiring areas; the scan line is configured to provide a scan signal; and
   a plurality of columns of data lines, formed on the first substrate, wherein at least one column of the data line is located in one of the second wiring areas, the data line is configured to provide a data signal, and a distance between a side of the data line away from the first substrate and the first substrate is greater than a distance between a side of the scan line away from the first substrate and the first substrate,
   wherein an orthographic projection of at least part of the spacer on the first substrate overlaps with orthographic projections of the data lines in at least three adjacent columns of the second wiring areas on the first substrate.

2. The display panel according to claim 1, wherein the orthographic projections of the plurality of spacers on the first substrate overlap with orthographic projections of the data lines in at least three adjacent columns of the second wiring areas on the first substrate.

3. The display panel according to claim 1, wherein the orthographic projection of the spacer on the first substrate is located in the first wiring area.

4. The display panel according to claim 1, wherein the spacer is of a transparent material.

5. The display panel according to claim 1, wherein the spacers and the scan lines are set at intervals.

6. The display panel according to claim 1, wherein each of the second wiring areas is provided with one row of the data line, and the orthographic projection of the spacer on the first substrate overlaps with orthographic projections of two adjacent data lines on the first substrate.

7. The display panel according to claim 1, wherein the plurality of spacers comprise a primary spacer and a secondary spacer, and a length of the primary spacer is greater than that of the secondary spacer in a direction of the array substrate towards the opposite substrate.

8. The display panel according to claim 7, wherein one end of the primary spacer is connected with the opposite substrate, another end of the primary spacer is connected with the data line, one end of the secondary spacer is connected with the opposite substrate, and a gap exists between another end of the secondary spacer and the data line.

9. The display panel according to claim 7, wherein one end of the primary spacer is connected with the data line, another end of the primary spacer is connected with the opposite substrate, one end of the secondary spacer is connected with the data line, and a gap exists between another end of the secondary spacer and the opposite substrate.

10. The display panel according to claim 1, wherein the array substrate further comprises:
a plurality of sub-pixel units, formed on the first substrate, wherein each of the sub-pixel units comprises a pixel electrode at least partially located in the sub-pixel area, a common electrode and a transistor at least partially located in the first wiring area, the transistor comprises a gate electrode, a first electrode and a second electrode, the first electrode is connected with the pixel electrode, the second electrode is connected with the data line, and the gate electrode is connected with the scan line.

11. The display panel according to claim 10, wherein the array substrate further comprises:
a plurality of rows of common lines, formed on the first substrate, wherein at least one row of the common line is located in one of the first wiring areas, the common line is connected with the common electrode and configured to provide a common signal to the sub-pixel unit.

12. The display panel according to claim 11, wherein one row of the scan line and one row of the common line are provided within each of the first wiring areas.

13. The display panel according to claim 10, wherein the pixel electrode is located on a side of the common electrode close to the first substrate, and the common electrode is a slit electrode.

14. The display panel according to claim 10, wherein the display panel further comprises:
liquid crystal molecules, located between the opposite substrate and the array substrate.

15. The display panel according to claim 10, wherein the opposite substrate comprises:
a second substrate, comprising a plurality of display areas and a non-display area surrounding the display areas, wherein the plurality of display areas are provided in one-to-one correspondence with the plurality of sub-pixel units;
a color film layer, disposed on the second substrate and located in the display area;
a black matrix, provided on the second substrate and located in the non-display area.

16. The display panel according to claim 15, wherein an orthographic projection of the spacer on the second substrate overlaps with an orthographic projection of the black matrix on the second substrate.

17. A display device, comprising a display panel, wherein the display panel comprises: an array substrate, an opposite substrate opposite to the array substrate, and a plurality of spacers disposed between the opposite substrate and the array substrate,
wherein the array substrate comprises:
a first substrate, comprising a plurality of sub-pixel areas arranged in an array along a row direction and a column direction, a first wiring area disposed between two adjacent rows of the sub-pixel areas, and a second wiring area disposed between two adjacent columns of the sub-pixel areas;
a plurality of rows of scan lines, formed on the first substrate, wherein at least one row of the scan line is located in one of the first wiring areas; the scan line is configured to provide a scan signal; and
a plurality of columns of data lines, formed on the first substrate, wherein at least one column of the data line is located in one of the second wiring areas, the data line is configured to provide a data signal, and a distance between a side of the data line away from the first substrate and the first substrate is greater than a distance between a side of the scan line away from the first substrate and the first substrate,
wherein an orthographic projection of at least part of the spacer on the first substrate overlaps with orthographic projections of the data lines in at least two three adjacent columns of the second wiring areas on the first substrate.

18. The display device according to claim 17, wherein the orthographic projections of the plurality of spacers on the first substrate overlap with orthographic projections of the data lines in at least three adjacent columns of the second wiring areas on the first substrate.

* * * * *